US009240735B2

(12) United States Patent
Choi et al.

(10) Patent No.: US 9,240,735 B2
(45) Date of Patent: Jan. 19, 2016

(54) STANDBY POWER REDUCTION DEVICE (71) Applicant: Korchip Corporation, Gyeonggi-do (KR)

(72) Inventors: Soon Joo Choi, Gyeonggi-do (KR); Jin Hyoung Son, Gyeonggi-do (KR)

(73) Assignee: Korchip Corporation, Gyeonggi-do (KR)

(*) Notice: Subject to any disclaimer, the term of this patent is extended or adjusted under 35 U.S.C. 154(b) by 179 days.

(21) Appl. No.: 14/156,605

(22) Filed: Jan. 16, 2014

(65) Prior Publication Data

US 2014/0204637 A1   Jul. 24, 2014

(30) Foreign Application Priority Data

Jan. 22, 2013  (KR) .................. 10-2013-0007061

(51) Int. Cl.
*H02M 7/06* (2006.01)
*H02J 9/00* (2006.01)
*H02M 3/335* (2006.01)

(52) U.S. Cl.
CPC ............... *H02M 7/064* (2013.01); *H02J 9/005* (2013.01); *H02M 3/335* (2013.01)

(58) Field of Classification Search
CPC ......... H02M 7/06; H02M 7/064; H02M 7/12; H02M 7/155; H02M 3/335; H02J 9/005
See application file for complete search history.

(56) References Cited

U.S. PATENT DOCUMENTS

| 6,563,720 | B2* | 5/2003 | Kitano | H02M 3/33523 363/21.12 |
| 8,824,172 | B2* | 9/2014 | Chen | H02M 3/33507 363/21.12 |
| 8,824,181 | B2* | 9/2014 | Choi | H02M 3/335 363/89 |
| 2006/0098462 | A1 | 5/2006 | Usui | |

FOREIGN PATENT DOCUMENTS

| JP | 1999-025157 | 4/1999 |
| JP | 2005-137160 | 5/2005 |
| JP | 2008-306927 | 12/2008 |
| JP | 2010-268255 | 11/2010 |
| KR | 10-1088915 | 12/2011 |

* cited by examiner

*Primary Examiner* — Matthew Nguyen (57) ABSTRACT

A standby power reduction device is provided, including a capacitor connected in parallel to a main switch controlling a switching mode power supply, without the necessity of providing a starting circuit, thereby reducing the cost and enabling miniaturization of product.

20 Claims, 8 Drawing Sheets

STANDBY POWER REDUCTION DEVICE

CROSS-REFERENCE TO RELATED APPLICATION

This application claims priority to and the benefit of Korean Patent Application No. 10-2013-0007061 filed on Jan. 22, 2013, which is herein incorporated by reference in its entirety.

BACKGROUND OF THE INVENTION

1. Field of the Invention

The present invention relates to a standby power reduction device.

2. Description of the Related Art

In general, a standby power reduction device using an electric double layer capacitor (EDLC) charges electric energy in the EDLC having a large capacity and the electric energy charged in the EDLC is used in a lowest amount of electric energy required in a standby state in which no electric device is used. Therefore, AC power is completely interrupted during a standby time of an electronic device, thereby reducing a loss in the standby power supplied from the AC power.

Meanwhile, when an electronic device is forwarded from a factory to be connected to AC power for the first time, when AC power is replenished after long-time power interruption, or when AC power is reconnected after long-time disconnection, EDLC may be discharged and it is not possible to start the electronic device.

Therefore, it is necessary to provide a starting circuit capable of starting the SMPS by sensing the AC power supplied for the first time. However, since the starting circuit operates just one time when a power cord is connected to AC power for the first time but does not perform any function while the electronic device is driven. Therefore, the starting circuit may increase the cost and may make it difficult to achieve miniaturization of product.

SUMMARY OF THE INVENTION

Aspects of the present invention provide a standby power reduction device, which can reduce the cost and enables miniaturization of product.

In accordance with one aspect of the present invention, there is provided a standby power reduction device including a switching mode power supply (SMPS) receiving a power voltage rectified from AC power and generating a first output voltage and a second output voltage, a voltage-dividing circuit electrically connected to the SMPS, receiving the second output voltage and generating a divided voltage, a control circuit electrically connected to the voltage-dividing circuit, operated by the divided voltage and including a control transistor, a charging circuit electrically connected to the control circuit, operated by the control circuit and including a booster transistor, an electric double layer capacitor (EDLC) electrically connected to the charging circuit and charging electric energy by the charging circuit, a voltage detector connected in parallel to the EDLC and detecting a charge voltage of the EDLC, a control switch electrically connected to the control circuit, operated by the control circuit and including a first switching transistor, a main switch operated by the control switch, controlling the operation of the SMPS and including a second switching transistor and a wired OR circuit, a photo-coupler controlling the operation of the main switch according to a command of a device operated by a first output voltage, and a first capacitor connected in parallel to the second switching transistor of the main switch, wherein the first capacitor operates the SMPS using a current flowing in the first capacitor when an electronic device is connected to the AC power for the first time.

The second switching transistor may be operated by logically summing (ORing) on an output of the photo-coupler, an output of the voltage detector and an output of the control circuit.

If the charge voltage is lower than a lowest charge voltage, the voltage detector may operate the main switch.

A base voltage of the control transistor may be determined by the divided voltage and an emitter voltage of the control transistor may be determined by the charge voltage of the EDLC.

The standby power reduction device may further include a hysteresis circuit connected between the voltage-dividing circuit and the control switch. Here, the hysteresis circuit adds a hysteresis characteristic to the control circuit.

If the charge voltage of the EDLC reaches a hysteresis voltage, the control transistor may be turned on to charge the EDLC by turning on the booster transistor, and if the charge voltage of the EDLC reaches a highest charge voltage, the control transistor may be turned off to stop charging the EDLC by turning off the booster transistor.

The hysteresis voltage may be a voltage obtained by subtracting 0.6 V that is a forward base-emitter voltage required to turn on the control transistor from the divided voltage that is a voltage when the control transistor is in a turned-off state.

The highest charge voltage may be a voltage obtained by subtracting 0.6 V that is a forward base-emitter voltage required to turn on the control transistor from the divided voltage that is a voltage when the control transistor is in a turned-on state.

If the control transistor is turned on, the booster transistor and the first switching transistor may be turned on, and if the control transistor is turned off, the booster transistor and the first switching transistor may be turned off.

If the first switching transistor is turned on, the second switching transistor may be turned on to maintain the SMPS at an operated state.

A time constant determined by an amount of current passing through the first capacitor and the SMPS may be greater than a time required until the second switching transistor is turned on by the second output voltage.

The standby power reduction device may further include a time constant circuit electrically connected between an output terminal of the SMPS and the main switch. Here, the time constant circuit has a resistor and a second capacitor connected in series.

If the second output voltage is generated, the time constant circuit may reduce capacitance of the first capacitor by turning on the second switching transistor.

The time constant of the time constant circuit may be set to be greater than a sum of a time required to turn on the control transistor and a time required to turn on the first switching transistor.

In accordance with another aspect of the present invention, there is provided a standby power reduction device including a switching mode power supply (SMPS) receiving a power voltage rectified from AC power and generating a first output voltage and a second output voltage; a voltage-dividing circuit electrically connected to the SMPS, receiving the second output voltage and generating a divided voltage; a control circuit electrically connected to the voltage-dividing circuit, operated by the divided voltage and including a control transistor; a charging circuit electrically connected to the control circuit, operated by the control circuit and including a booster transistor; an electric double layer capacitor (EDLC) electrically connected to the charging circuit and charging electric energy by the charging circuit; a voltage detector connected in parallel to the EDLC and detecting a charge voltage of the EDLC; a control switch electrically connected to the control circuit, operated by the control circuit and including a first switching transistor; a main switch operated by the control switch, controlling the operation of the SMPS and including a second switching transistor and a wired OR circuit; a photo-coupler controlling the operation of the main switch according to a command of a device operated by a first output voltage; and a time constant circuit electrically connected between an input terminal of the SMPS and the main switch, wherein the time constant circuit operates the SMPS using a current flowing in the time constant circuit when an electronic device is connected to the AC power for the first time.

The time constant of the time constant circuit may be set to be greater than a sum of a time required to turn on the control transistor and a time required to turn on the first switching transistor.

The second switching transistor may be operated by logically summing (ORing) on an output of the photo-coupler, an output of the voltage detector, an output of the control circuit and an output of the time constant circuit.

As described above, since the standby power reduction device according to the embodiment of the present invention includes a capacitor connected in parallel to a main switch, a switching mode power supply can drive using a current flowing in the capacitor when an electronic device is connected to AC power for the first time.

Accordingly, the standby power reduction device according to the embodiment of the present invention may have no loss in the power measured from AC power when the electronic device is in a standby state without using a starting circuit in a state in which the EDLC is not charged.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present disclosure will be described in detail with reference to the accompanying drawings in such a manner that the technical idea of the present disclosure may easily be carried out by a person with ordinary skill in the art to which the invention pertains. Objects, operations, effects, other objects, characteristics and advantages of the present disclosure will be easily understood from an explanation of a preferred embodiment that will be described in detail below by reference to the attached drawings.

Although embodiments have been described with reference to illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

Hereinafter, examples of embodiments of the invention will be described in detail with reference to the accompanying drawings such that they can easily be made and used by those skilled in the art.

Like numbers refer to like elements throughout. In addition, it will be understood that when an element or layer is referred to as being "electrically connected to" another element or layer, it can be directly connected to the other element or layer or intervening elements or layers may be present.

Figure 1:
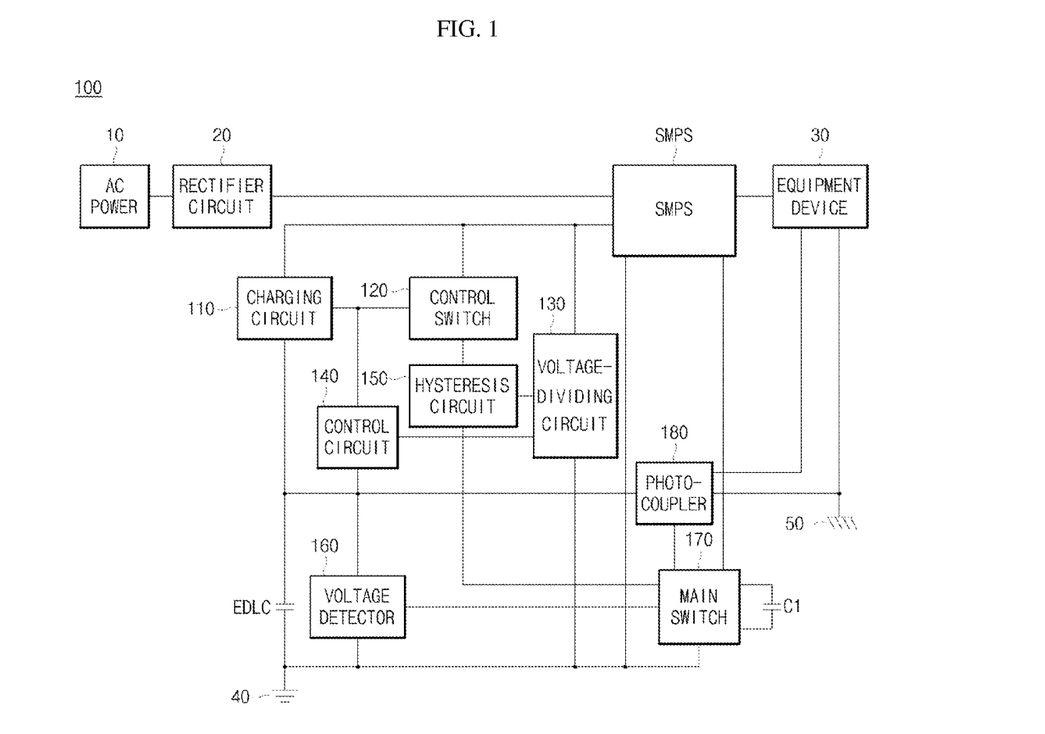
FIG. 1 is a block diagram of a standby power reduction device according to an embodiment of the present invention.
Figure 2:
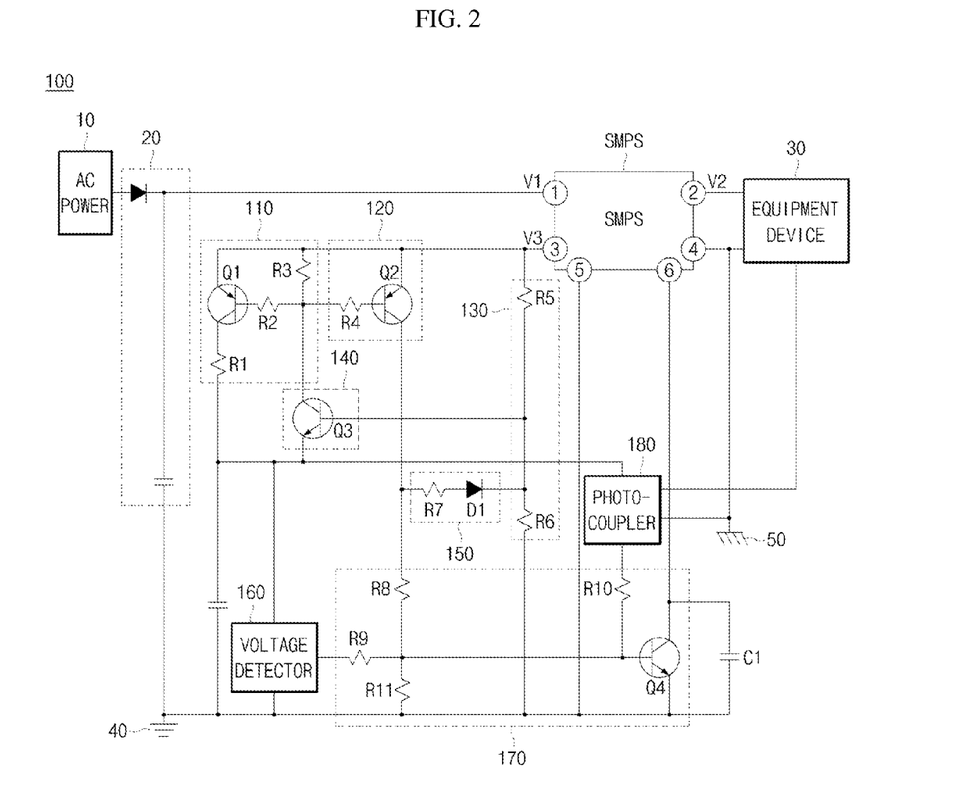
FIG. 2 is a circuit view of the standby power reduction device shown in FIG. 1.

FIG. 1 is a block diagram of a standby power reduction device according to an embodiment of the present invention and FIG. 2 is a circuit view of the standby power reduction device shown in FIG. 1.

Referring to FIGS. 1 and 2, the standby power reduction device 100 according to an embodiment of the present invention includes a switching mode power supply (SMPS), a charging circuit 110, a control switch 120, a voltage-dividing circuit 130, a control circuit 140, a hysteresis circuit 150, an electric double layer capacitor (EDLC), a voltage detector 160, a main switch 170, a photo-coupler 180 and a first capacitor C1.

The SMPS receives a power voltage V1 rectified from AC power 10 through the rectifier circuit 20 and generates a first output voltage V2 and a second output voltage V3. If a voltage of a sixth terminal 6 is lowered to a preset value or less in a state in which the power voltage V1 is supplied to a first terminal 1 of the SMPS, a voltage difference greater than or equal to the preset value is created between the first terminal 1 and the sixth terminal 6. As a result, the SMPS is operated to generate the first output voltage V2 between a second terminal 2 and a fourth terminal 4 and the second output voltage V3 between a third terminal 3 and a fifth terminal 5. The SMPS may stably maintain the first output voltage V2 and the second output voltage V3, irrespective of a voltage variation within a voltage range set between the first terminal 1 and the sixth terminal 6. Here, a voltage between the first terminal 1 and the sixth terminal 6 may be set to be in a range of 100 to 300 VDC. If the SMPS is operated, the second terminal 2 supplies the first output voltage V2 to the equipment device 30, and the third terminal 3 supplies the second output voltage V3 to the charging circuit 110, the control switch 120 and the voltage-dividing circuit 130. The fourth terminal 4 of the SMPS is connected to an equipment ground 50, and the fifth terminal 5 is connected to a power ground 40. Here, the equipment ground 50 and the power ground 40 are electrically coupled to each other while maintaining a highly insulated state by an insulating transformer included in the SMPS.

The charging circuit 110 charges the EDLC. The charging circuit 110 includes a booster transistor Q1, a first resistor R1, and a second resistor R2 and a third resistor R3. The booster transistor Q1 receives a charge current from the third terminal 3 of the SMPS and charges the EDLC. The first to third resistors R1 to R3 protect the booster transistor Q1 from over-current.

The control switch 120 controls the main switch 170. The control switch 120 includes a first switching transistor Q2 and a fourth resistor R4. If the SMPS is instantaneously operated to then generate the second output voltage V3, a control transistor Q3 is turned on, and if the control transistor Q3 is turned on, the first switching transistor Q2 is turned on. If the first switching transistor Q2 is turned on, a current is allowed to flow to the main switch 170, thereby turning on a second switching transistor Q4 of the main switch 170.

The voltage-dividing circuit 130 sets an operating point of the control circuit 140. The voltage-dividing circuit 130 includes a fifth resistor R5 and a sixth resistor R6 and has the fifth resistor R5 and the sixth resistor R6 connected in series. The voltage-dividing circuit 130 receives the second output voltage V3 through the SMPS. The voltage-dividing circuit 130 divides the second output voltage V3 to generate a divided voltage VB and supplies the divided voltage VB to the control circuit 140.

Meanwhile, when the control transistor Q3 of the control circuit 140 is turned off, the first divided voltage VB1 is determined by Equation (1). Here, a base current of the control transistor Q3 is ignored.

$$VB1 = R6*V3/(R5+R6) \quad (1)$$

In addition, when the control transistor Q3 of the control circuit 140 is turned on, the second divided voltage VB2 is determined by Equation (2). Here, a base current of the control transistor Q3 is ignored.

$$VB2 = R6*\{V3/(R5+R6)\} + R6*\{(V3-VCE2-VF2)/(R7+R6)\}$$

$$VB2 = VB1 + R6*\{(V3-VCE2-VF2)/(R7+R6)\} \quad (2)$$

where VCE2 is a voltage drop between a collector and an emitter when the first switching transistor Q2 is turned on, and VF2 is a forward voltage drop of a first diode D1.

Therefore, the second divided voltage VB2 is higher than the first divided voltage VB1.

The control circuit 140 controls the charging circuit 110 and the control switch 120. The control circuit 140 includes the control transistor Q3. If the control transistor Q3 is turned on, the booster transistor Q1 of the charging circuit 110 and the first switching transistor Q2 of the control switch 120 are turned on. In addition, if the control transistor Q3 is turned off, the booster transistor Q1 of the charging circuit 110 and the first switching transistor Q2 of the control switch 120 are turned off. While the booster transistor Q1 and the first switching transistor Q2 are controlled by the control transistor Q3, they are isolated by the second resistor R2 and the fourth resistor R4, so as not to affect each other.

A base voltage of the control transistor Q3 is determined by the divided voltage VB of the voltage-dividing circuit 130. In addition, an emitter voltage of the control transistor Q3 is determined by a charge voltage VC of the EDLC. Therefore, a turned-on or turned-off state of the control transistor Q3 may be determined by a relationship between the divided voltage VB and the voltage VC. That is to say, if a value obtained by subtracting 0.6 V from the divided voltage VB is greater than the charge voltage VC (VB−0.6V>VC), the control transistor Q3 is in a turned-on state. In addition, if a value obtained by subtracting 0.6 V from the divided voltage VB is smaller than the charge voltage VC (VB−0.6V<VC), the control transistor Q3 is in a turned-off state. Here, 0.6 V is a forward voltage between the base and the emitter, which is required to turn on the control transistor Q3.

Based on the above-stated finding, a hysteresis voltage (VH1) and a highest charge voltage (VH2) may be set by Equation (3) as follows:

$$VH1 = VB1 - 0.6V$$

$$VH2 = VB2 - 0.6V \quad (3)$$

where the hysteresis voltage VH1 is a charge resume voltage at which charging of the EDLC is resumed in a state in which the control transistor Q3 is turned off, and the highest charge voltage VH2 is a charge stop voltage when charging of the EDLC is performed in a state in which the control transistor Q3 is turned on.

Here, 0.6 V is a forward voltage between the base and the emitter, which is required to turn on the control transistor Q3.

The hysteresis circuit 150 adds a hysteresis characteristic to the control circuit 140. The hysteresis circuit 150 includes a first diode D1 and a seventh resistor R7.

The EDLC stores electric energy. The EDLC may store the electric energy through the charging circuit 110.

The voltage detector 160 is connected in parallel to the EDLC and detects the charge voltage of the EDLC VC. If the charge voltage of the EDLC VC is lower than a lowest charge voltage (VL), the voltage detector 160 operates the main switch 170 using a current flowing from the EDLC. In addition, if the charge voltage of the EDLC VC is higher than the lowest charge voltage VL, the voltage detector 160 interrupts the current from being supplied to the main switch 170

The main switch 170 drives the SMPS. The main switch 170 includes a second switching transistor Q4 and a wired OR circuit. The wired OR circuit includes an eighth resistor R8, a ninth resistor R9, a tenth resistor R10 and an eleventh resistor R11. The wired OR circuit operates the second switching transistor Q4 by logically summing (ORing) currents supplied from the first switching transistor Q2, the voltage detector 160 and the photo-coupler 180. That is to say, the second switching transistor Q4 is turned off if there is no current supplied from the first switching transistor Q2, the voltage detector 160 and the photo-coupler 170, and is turned on if there is a current supplied from one of the first switching transistor Q2, the voltage detector 160 and the photo-coupler 170.

The photo-coupler 180 receives a turn-on command from a control circuit (not shown) of a side of the equipment ground 50 and operates the main switch 170 using a current flowing from the EDLC, and interrupts the operation of the main switch 170 by interrupting the current supplied from the EDLC.

The first capacitor C1 is connected in parallel to the main switch 170 and instantaneously operates the SMPS when a power cord is connected to the AC power 10 for the first time. In detail, the first capacitor C1 is connected in parallel to the second switching transistor Q4. If an electronic device is connected to the AC power 10 for the first time, the first capacitor C1 is charged and instantaneously operates the SMPS due to over-current. If the charging of the first capacitor C1 is completed after the lapse of a predetermined time, no further over-current flows.

A charge voltage VC1 of the first capacitor C1 until the first capacitor C1 is fully charged is determined by Equation (4). Here, it is assumed that a current IS passing through the first terminal 1 and the sixth terminal 6 of the SMPS is maintained at a fixed value, irrespective of a voltage variation between the first terminal 1 and the sixth terminal 6.

$$VC1 = IS*t/C \quad (4)$$

where t is a charge time and C is capacitance of the first capacitor C1.

Therefore, the minimum voltage Von between the first terminal 1 and the sixth terminal 6, by which the SMPS is continuously operated, and a time (ton(SMPS)) in which the SMPS can be continuously operated by the first capacitor C1, is determined by Equation (5):

$$ton\ (SMPS = \{(V1-Von)*C\}/IS \quad (5)$$

In order to keep the SMPS operating, irrespective of the first capacitor C1, a sum of a time ton Q3, a time ton Q2 and a time ton Q4 is required, the time ton Q3 taken until a current IQ3 is generated by a base current supplied to the control transistor Q3 and the control transistor Q3 is turned on, the time ton Q2 taken until the first switching transistor Q2 is turned on by the control transistor Q3 to generate a current IQ2, and the time ton Q4 taken until the second switching transistor Q4 is turned on by the first switching transistor Q2 to generate a current IQ4. That is to say, a time tx required to maintain the SMPS at the operated state by the second switching transistor Q4 from a time at which the base current is supplied to the control transistor Q3 after the SMPS is instantaneously operated to generate the second output voltage V1, is determined by Equation (6):

$$tx = ton\ Q3 + ton\ Q2 + ton\ Q4 \quad (6).$$

Accordingly, in order to make the standby power reduction device 100 smoothly operate, the following Equation (7) should be satisfied:

$$tx < ton(SMPS)$$

$$C > (tx*IS)/(V1-Von) \quad (7)$$

Figure 3:
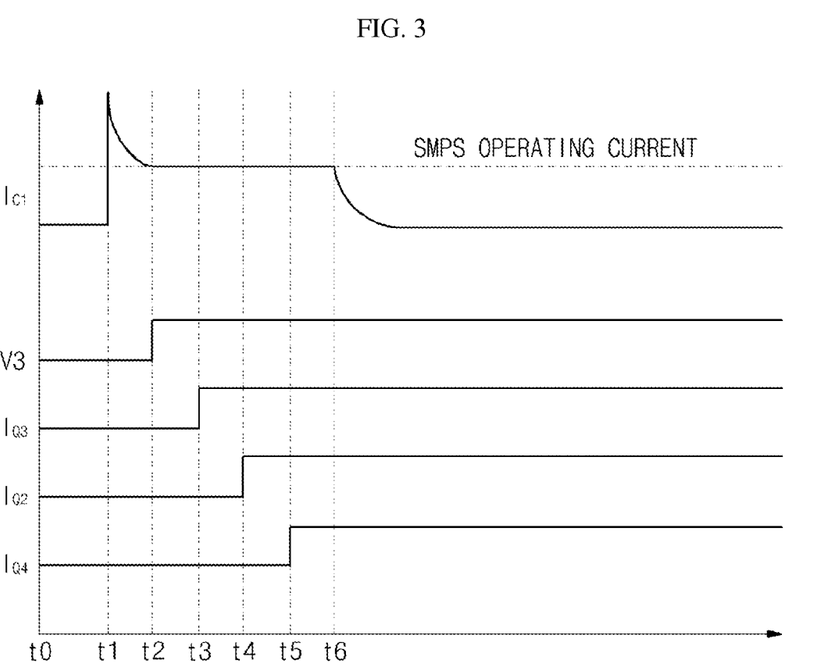
FIG. 3 is a time chart illustrating an initial operation of the standby power reduction device shown in FIG. 1.

FIG. 3 is a time chart illustrating an initial operation of the standby power reduction device shown in FIG. 1.

An initial operation of the aforementioned standby power reduction device 100 will now be described with reference to FIG. 3.

At a time t0, the power cord of the electronic device has yet to be connected to the AC power 10, so that the power voltage V1 is 0 V. In addition, since the EDLC has yet to be charged, the charge voltage VC is 0 V and the first output voltage V2 and the second output voltage V3 of the SMPS are both 0 V.

At a time t1, if the power cord of the electronic device is connected to the AC power 10 for the first time, the first capacitor C1 is charged and a current IC1 flows to operate the SMPS. However, the second output voltage V3 has yet to be output. That is to say, a predetermined time is required until the second output voltage V3 is output.

At a time t2, the SMPS is operated to output the second output voltage V3 and a base current is supplied to the control transistor Q3. Here, in order to turn on the control transistor Q3, a time ton Q3 is required.

At a time t3, the control transistor Q3 is turned on to allow the current IQ3 to flow therein. However, in order to turn on the first switching transistor Q2, a time ton Q2 is required.

At a time t4, the booster transistor Q1 is turned on by the control transistor Q3 to charge the EDLC. In addition, the first switching transistor Q2 is turned on to allow the current IQ2 to flow therein. However, in order to turn on the second switching transistor Q4, a time ton Q4 is required.

At a time t5, the second switching transistor Q4 is turn on to allow the current IQ4 to flow therein, so that the SMPS is maintained at an operated state by the current IQ4 of the second switching transistor Q4, rather than the current IC1 of the first capacitor C1. If the second switching transistor Q4 is turned on, the current flowing between the first terminal 1 and the sixth terminal 6 of the SMPS is the current IQ4 flowing by the second switching transistor Q4. Thus, the amount of the current IC1 flowing in the first capacitor C1 becomes 0.

As stated above, the amount of the current IC1 flowing in the first capacitor C1 becomes 0 at the time t5 before reaching a time t6. However, if the second switching transistor Q4 is not turned on until the time t6, the amount of the current IC1 flowing in the first capacitor C1 is reduced, thereby making the SMPS stop operating.

As described above, the standby power reduction device according to an embodiment of the present invention includes a capacitor connected in parallel to a main switch. Therefore, when an electronic device is connected to AC power for the first time, a switching power circuit can be operated using the current flowing in the capacitor.

Figure 4:
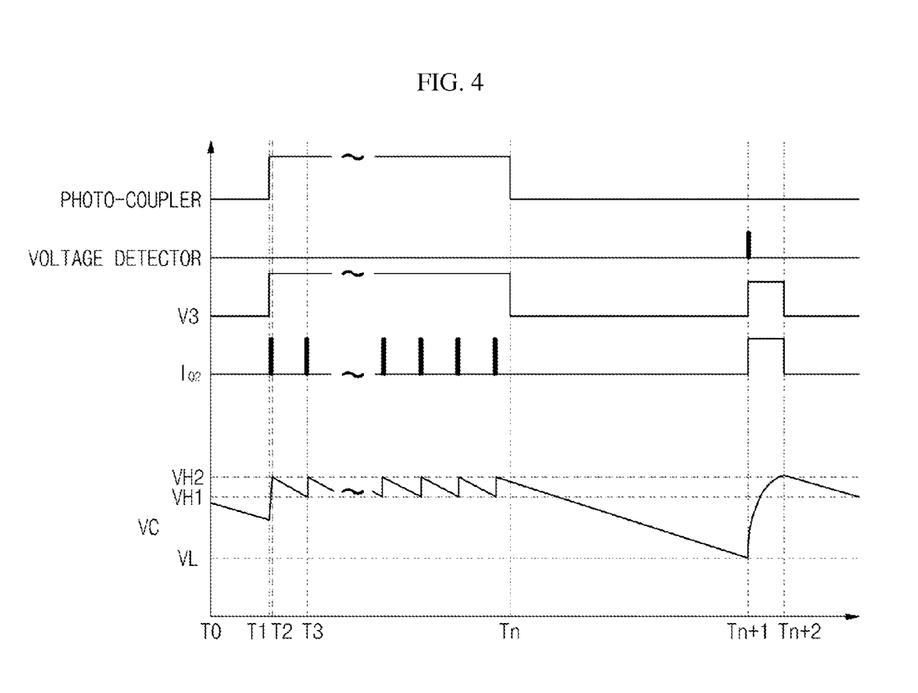
FIG. 4 is a time chart illustrating a hysteresis operation of a control transistor.

FIG. 4 is a time chart illustrating a hysteresis operation of a control transistor.

The operation of the control transistor will now be described with reference to FIG. 4.

At a time T0, an electric double layer capacitor (EDLC) in a charged state is slowly discharged by the current internally consumed by the standby power reduction device 100, so that it has a charge voltage VC lower than a hysteresis voltage VH1.

At a time T1, if a user turns on a power switch to use an equipment device 30, a command instructing the SMPS to be operated is transmitted from a control circuit (not shown) included in the equipment device 30 positioned at a side of the equipment ground 50 to the photo-coupler 180. The photo-coupler 180 allows a current to flow from the EDLC to turn on a second switching transistor Q4, thereby maintaining the SMPS at an operated state. If the SMPS is operated, a first output voltage V2 is supplied to the equipment device 30, so that the equipment device 30 operates. In addition, if the SMPS is operated, a second output voltage V3 is supplied to turn on the control transistor Q3, thereby turning on the booster transistor Q1 and the first switching transistor Q2. If the first switching transistor Q2 is turned on, the current IQ2 is supplied to a base of the second switching transistor Q4. However, since a current is being supplied to the second switching transistor Q4 from the photo-coupler 180, the second switching transistor Q4 is not affected by the current IQ2 supplied from the first switching transistor Q2. In addition, according to the flow of the current IQ2 supplied from the first switching transistor Q2, the current is supplied to the voltage-dividing circuit 130 through the hysteresis circuit 150, the divided voltage VB increases to the second divided voltage VB2.

At a time T2, the charge voltage of the EDLC VC increases to the highest charge voltage VH2. If the charge voltage VC reaches the highest charge voltage VH2, the control transistor Q3 is turned off and the booster transistor Q1 is also turned off, thereby stopping charging of the EDLC. In addition, as the control transistor Q3 is turned off, the first switching transistor Q2 is turned off, so that the current IQ2 of the first switching transistor Q2 is not supplied to the second switching transistor Q4. However, since the current is being supplied to the second switching transistor Q4 from the photo-coupler 180, the second switching transistor Q4 is maintained at a turned-on state. In addition, since the current IQ2 of the first switching transistor Q2 does not flow, supplying of the current through the hysteresis circuit 150 is stopped, so that the divided voltage VB decreases to reach a level of the first divided voltage VB1. In addition, since the EDLC stops being charged, a level of the charge voltage VC is slowly lowered.

At a time T3, the charge voltage of the EDLC VC decreases to reach the hysteresis voltage VH1 to turn on the control transistor Q3 again. Accordingly, the operations performed at the times T1 to T3 are repeated.

Here, the operations performed at the times T1 to T3 are repeated until the user turns off the power switch to stop using the equipment device 30. However, since the current is being supplied from the photo-coupler 180, there are no changes other than stopping and resuming of the charging of the EDLC using the booster transistor Q1.

At a time Tn, if the user turns off the power switch to stop using the equipment device 30, the supplying of the current from the photo-coupler 180 is stopped to turn off the second switch transistor Q4. If the second switch transistor Q4 is turned off, the SMPS stops operating, and the charge voltage VC of the EDLC is discharged due to the current internally consumed by the standby power reduction device 100 to slow decrease.

At a time (Tn+1), if the charge voltage VC reaches the lowest charge voltage VL, the voltage detector 160 allows the current to flow from the EDLC to turn on the second switching transistor Q4, thereby operating the SMPS. If the SMPS is operated, the second output voltage V3 is supplied to turn on the control transistor Q3, thereby turning on the booster transistor Q1 and the first switching transistor Q2. If the control transistor Q3 is turned on, the same operation as that performed at the time T1 is performed. If the booster transistor Q1 is turned on to charge the EDLC, the charge voltage VC increases to become higher than the lowest charge voltage VL, so that the voltage detector 160 stops operating. However, since the current of the first switching transistor Q2 is being supplied until the charge voltage VC of the EDLC reaches the highest charge voltage VH2, the second switching transistor Q4 is maintained at a turned-on state.

At a time (Tn+2), if the charge voltage of the EDLC VC reaches the highest charge voltage VH2, the control transistor Q3 is turned off to make the EDLC stop being charged, and the charge voltage of the EDLC VC is discharged due to the current internally consumed by the standby power reduction device 100 to then slowly decrease.

As described above, in the standby power reduction device 100 according to an embodiment of the present invention, there is no loss in the power measured from the AC power 10 in a standby state of an electronic device without using a starting circuit in a state in which the EDLC is not charged.

Figure 5:
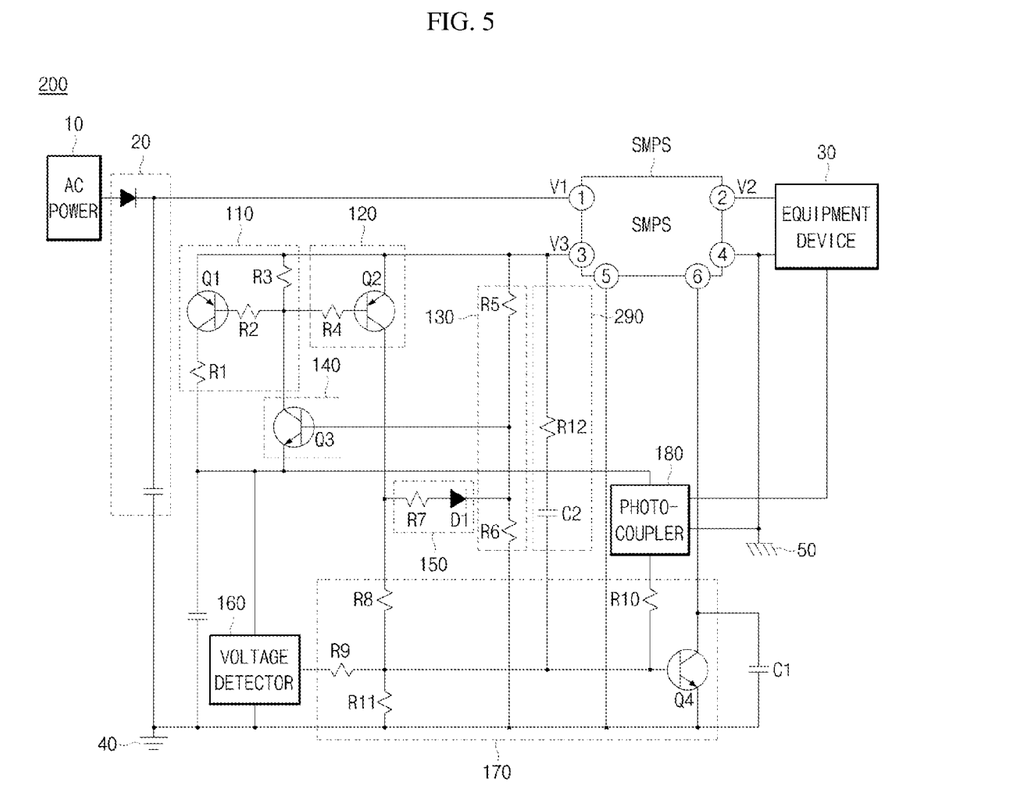
FIG. 5 is a circuit view of a standby power reduction device shown according to another embodiment of the present invention.

FIG. 5 is a circuit view of a standby power reduction device according to another embodiment of the present invention.

The standby power reduction device 200 shown in FIG. 5 is substantially the same as the standby power reduction device 100 shown in FIG. 2, except for a time constant circuit 290. Therefore, the following description will focus on the time constant circuit 290.

Referring to FIG. 5, the standby power reduction device 200 according to another embodiment of the present invention includes a switching mode power supply (SMPS), a charging circuit 110, control switch 120, a voltage-dividing circuit 130, a control circuit 140, a hysteresis circuit 150, an electric double layer capacitor (EDLC), a voltage detector 160, a main switch 170, a photo-coupler 180, a first capacitor C1 and a time constant circuit 290.

The time constant circuit 290 is electrically connected between the SMPS and the main switch 170. The time constant circuit 290 includes a twelfth resistor R12 and a second capacitor C2. The time constant circuit 290 turns on a second switching transistor Q4 of the main switch 170 at an early stage, thereby reducing capacitance of the first capacitor C1.

As soon as a second output voltage V3 of the SMPS is supplied, the time constant circuit 290 supplies an over-current to the second switching transistor Q4 and maintains the second switching transistor Q4 at a turned-on state for a time set by a time constant (τ), thereby maintaining the SMPS at an operated state. The over-current is not supplied any longer after the lapse of the time set by the time constant (τ) from a time at which the second output voltage V3 starts to be supplied. The time constant(τ) of the time constant circuit 290 is determined by Equation (8).

$$\tau = R12 * C2 \tag{8}$$

Therefore, the SMPS instantaneously operated by the first capacitor C1 keeps operating under the condition expressed by the following expression of inequality (9):

$$t\text{on } Q3 + t\text{on } Q2 < \tau \tag{9}$$

where ton Q3 is a turn-on time of the control transistor Q3 and ton Q2 is a turn-on time of the first switching transistor Q2.

That is to say, the SMPS can be maintained at the operated state by setting the time constant(τ) of the time constant circuit 290 to be greater than a time required to make both of the control transistor Q3 and the first switching transistor Q2 turned on.

Figure 6:
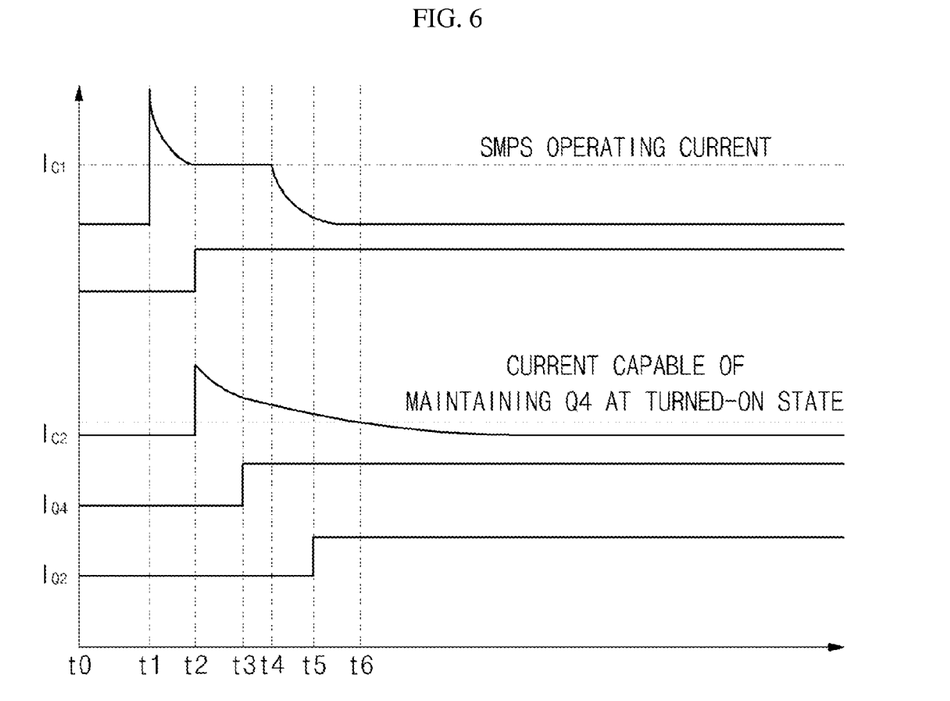
FIG. 6 is a time chart illustrating an initial operation of the standby power reduction device shown in FIG. 5.

FIG. 6 is a time chart illustrating an initial operation of the standby power reduction device shown in FIG. 5.

The operation of the standby power reduction device according to another embodiment of the present invention will now be described in detail with reference to FIG. 6.

At a time t0, since a power cord of the electronic device has yet to be connected to an AC power 10, so that a power voltage V1 is 0 V. In addition, since the EDLC has yet to be charged, the charge voltage VC is 0 V and a first output voltage V2 and a second output voltage V3 of the SMPS are both 0 V.

At a time t1, if the power cord of the electronic device is connected to the AC power 10 for the first time, the first capacitor C1 is charged and a current IC1 flows to operate the SMPS. However, the second output voltage V3 has yet to be output. That is to say, a predetermined time is required until the second output voltage V3 is output.

At a time t2, the SMPS is operated to output the second output voltage V3 and a base current is supplied to the control transistor Q3. Here, in order to turn on the control transistor Q3, a time ton Q3 is required. If the second output voltage V3 is supplied to the time constant circuit 290, an over-current $I_{C2}$ is supplied to the second switching transistor Q4 for a time set by the time constant($\tau$) of the time constant circuit 290. However, in order to turn on the second switching transistor Q4, a time ton Q4 is required.

At a time t3, the second switching transistor Q4 is turned on to allow a current IQ4 to flow, so that the SMPS is maintained at an operated state. If the second switching transistor Q4 is turned on, no current flows in the first capacitor C1.

As stated above, the amount of the current $I_{C1}$ flowing in the first capacitor C1 becomes 0 at the time t3 before reaching a time t4. However, if the second switching transistor Q4 is not turned on until the time t4, the amount of the current $I_{C1}$ flowing in the first capacitor C1 is reduced, thereby making the SMPS stop operating.

At a time t5, the booster transistor Q1 is turned on by the current of the control transistor Q3 to charge the EDLC. In addition, the first switching transistor Q2 is turned on to supply the current to the second switching transistor Q4. However, the second switching transistor Q4 is maintained at a turned-on state by the current $I_{C2}$ supplied by the time constant circuit 290.

At a time t6, the amount of the current $I_{C2}$ supplied by the time constant circuit 290 is reduced to reach so low a level of current that the second switching transistor Q4 cannot be maintained at the turned-on state. However, since the current $I_{C2}$ of the first switching transistor Q2 is being supplied, the second switching transistor Q4 is maintained at the turned-on state.

As described above, the standby power reduction device 200 includes the time constant circuit 290 to reduce capacitance of the first capacitor C1, thereby reducing the cost.

Figure 7:
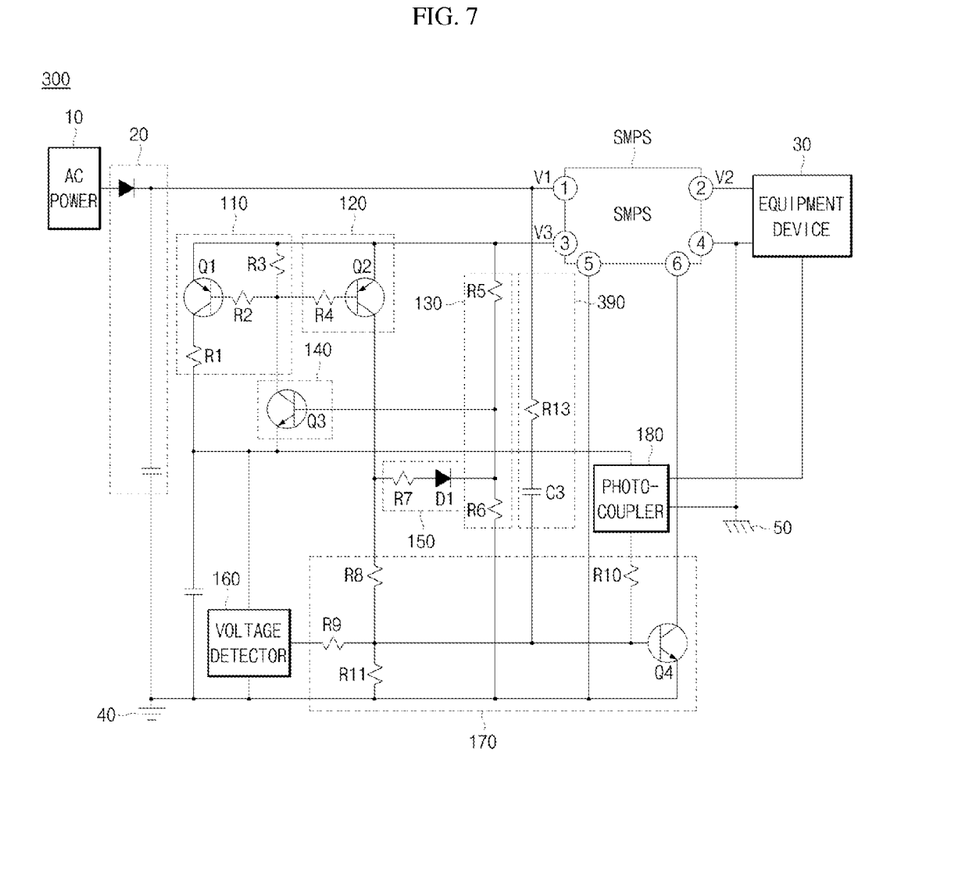
FIG. 7 is a circuit view of a standby power reduction device shown according to still another embodiment of the present invention.

FIG. 7 is a circuit view of a standby power reduction device shown according to still another embodiment of the present invention.

The standby power reduction device 300 shown in FIG. 7 is substantially the same as the standby power reduction device 100 shown in FIG. 2, except for a time constant circuit 390. In addition, unlike in the standby power reduction device 100 shown in FIG. 2, the first capacitor C1 is not provided in the standby power reduction device 300 shown in FIG. 7. Therefore, the following description will focus on the time constant circuit 390.

Referring to FIG. 7, the standby power reduction device 300 according to still another embodiment of the present invention includes a switching mode power supply (SMPS), a charging circuit 110, a control switch 120, a voltage-dividing circuit 130, a control circuit 140, a hysteresis circuit 150, an electric double layer capacitor (EDLC), a voltage detector 160, a main switch 170, a photo-coupler 180 and a time constant circuit 390.

The time constant circuit 390 is electrically connected between the rectifier circuit 20 and the main switch 170. The time constant circuit 390 includes a thirteenth resistor R13 and a third capacitor C3. Since the time constant circuit 390 is directly connected to the main switch 170 from an output of the rectifier circuit 20, an over-current is supplied to the second switching transistor Q4 as soon as a power cord of an electronic device is connected to AC power 10. Therefore, it is not necessary to provide a first capacitor connected in parallel to the second switching transistor Q4.

The time constant circuit 390 supplies the over-current to the second switching transistor Q as soon as a power voltage V1 is supplied, thereby turning on the second switching transistor Q4 for a time set by a time constant($\tau$) and maintaining the SMPS at an operated state.

Figure 8:
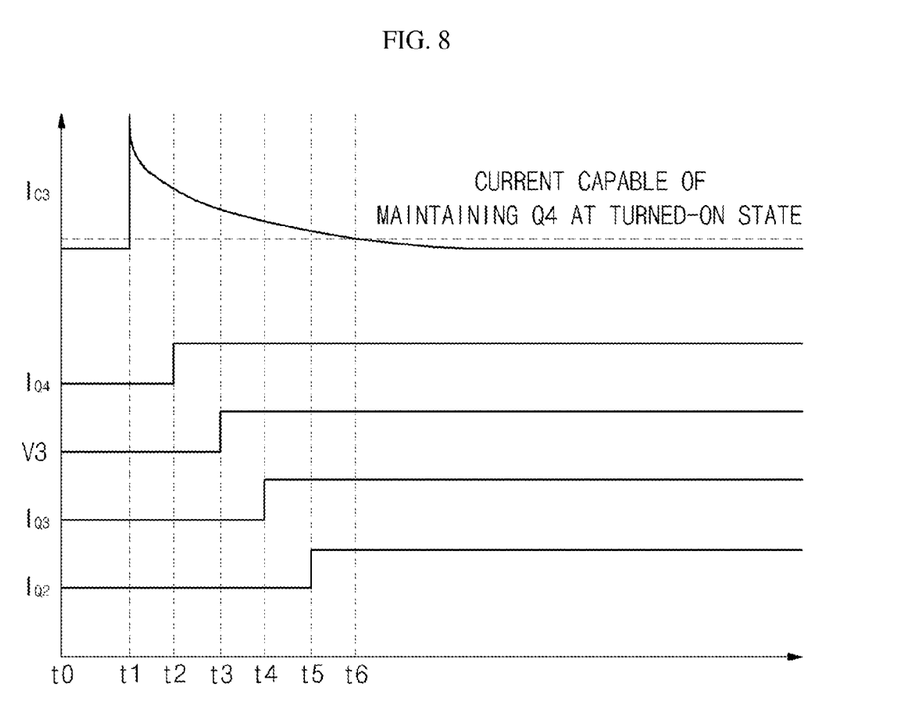
FIG. 8 is a time chart illustrating an initial operation of the standby power reduction device shown in FIG. 7.

FIG. 8 is a time chart illustrating an initial operation of the standby power reduction device shown in FIG. 7.

The operation of the standby power reduction device according to still another embodiment of the present invention will now be described in detail with reference to FIG. 8.

At a time t0, the power cord of the electronic device has yet to be connected to the AC power 10, so that a power voltage V1 is 0 V. In addition, since the EDLC has yet to be charged, the charge voltage VC is 0 V and a first output voltage V2 and a second output voltage V3 of the SMPS are both 0 V.

At a time t1, the power cord of the electronic device is connected to the AC power 10 for the first time, the power voltage V1 is supplied to the SMPS and the time constant circuit 390. If the power voltage V1 is supplied to the time constant circuit 390, an over-current $I_{C3}$ is supplied to the second switching transistor Q4 for a time set by the time constant ($\tau$). However, in order to turn on the second switching transistor Q4, a time ton Q4 is required.

At a time t2, the second switching transistor Q4 is turned on to allow a current IQ4 to flow therein, thereby operating the SMPS. However, the second output voltage V3 has yet to be output. That is to say, a predetermined time is required until the second output voltage V3 is output.

At a time t3, the SMPS starts to be operated to supply the second output voltage V3 to the control transistor Q3. However, in order to turn on the control transistor Q3, a time ton Q3 is required.

At a time t4, the control transistor Q3 is turned on to supply the current IQ3 to the booster transistor Q1 and the first switching transistor Q2. However, in order to turn on the booster transistor Q1, a time ton Q1 is required. In addition, in order to turn on the first switching transistor Q2, a time ton Q2 is required.

At a time t5, the first switching transistor Q2 is turned on to supply the current IQ2 to the second switching transistor Q4. However, since the current IQ3 is being supplied from the time constant circuit 390, the second switching transistor Q4 is maintained at a turned-on state.

At a time t6, the amount of the current $I_{C3}$ supplied by the time constant circuit 390 is reduced to reach so low a level of current that the second switching transistor Q4 cannot be maintained at the turned-on state. However, since the current $I_{C2}$ of the first switching transistor Q2 is being supplied, the second switching transistor Q4 is maintained at the turned-on state.

As described above, since the standby power reduction device 300 includes the time constant circuit 390 electrically connected between the rectifier circuit 20 and the main switch 170, it is not necessary to provide the first capacitor connected in parallel to the main switch 170.

Although the standby power reduction devices according to exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A standby power reduction device comprising:
   a switching mode power supply (SMPS) receiving a power voltage rectified from AC power and generating a first output voltage and a second output voltage;
   a voltage-dividing circuit electrically connected to the SMPS, receiving the second output voltage and generating a divided voltage;
   a control circuit electrically connected to the voltage-dividing circuit, operated by the divided voltage and including a control transistor;
   a charging circuit electrically connected to the control circuit, operated by the control circuit and including a booster transistor;
   an electric double layer capacitor (EDLC) electrically connected to the charging circuit and charging electric energy by the charging circuit;
   a voltage detector connected in parallel to the EDLC and detecting a charge voltage of the EDLC;
   a control switch electrically connected to the control circuit, operated by the control circuit and including a first switching transistor;
   a main switch operated by the control switch, controlling the operation of the SMPS and including a second switching transistor and a wired OR circuit;
   a photo-coupler controlling the operation of the main switch according to a command of a device operated by a first output voltage; and
   a first capacitor connected in parallel to the second switching transistor of the main switch,
   wherein the first capacitor operates the SMPS using a current flowing in the first capacitor when an electronic device is connected to the AC power for the first time.

2. The standby power reduction device of claim 1, wherein the second switching transistor is operated by locally summing (ORing) on an output of the photo-coupler, an output of the voltage detector and an output of the control circuit.

3. The standby power reduction device of claim 1, wherein if the charge voltage is lower than a lowest charge voltage, the voltage detector operates the main switch.

4. The standby power reduction device of claim 1, wherein a base voltage of the control transistor is determined by the divided voltage and an emitter voltage of the control transistor is determined by the charge voltage of the EDLC.

5. The standby power reduction device of claim 1, further comprising a hysteresis circuit connected between the voltage-dividing circuit and the control switch, wherein the hysteresis circuit adds a hysteresis characteristic to the control circuit.

6. The standby power reduction device of claim 5, wherein if the charge voltage of the EDLC reaches a hysteresis voltage, the control transistor is turned on to charge the EDLC by turning on the booster transistor, and if the charge voltage of the EDLC reaches a highest charge voltage, the control transistor is turned off to stop charging the EDLC by turning off the booster transistor.

7. The standby power reduction device of claim 6, wherein the hysteresis voltage is a voltage obtained by subtracting 0.6 V that is a forward base-emitter voltage required to turn on the control transistor from the divided voltage that is a voltage when the control transistor is in a turned-off state.

8. The standby power reduction device of claim 6, wherein the highest charge voltage is a voltage obtained by subtracting 0.6 V that is a forward base-emitter voltage required to turn on the control transistor from the divided voltage that is a voltage when the control transistor is in a turned-on state.

9. The standby power reduction device of claim 1, wherein if the control transistor is turned on, the booster transistor and the first switching transistor are turned on, and if the control transistor is turned off, the booster transistor and the first switching transistor are turned off.

10. The standby power reduction device of claim 1, wherein if the first switching transistor is turned on, the second switching transistor is turned on to maintain the SMPS at an operated state.

11. The standby power reduction device of claim 1, wherein a time constant determined by an amount of current passing through the first capacitor and the SMPS is greater than a time required until the second switching transistor is turned on by the second output voltage.

12. The standby power reduction device of claim 1, further comprising a time constant circuit electrically connected between an output terminal of the SMPS and the main switch, wherein the time constant circuit has a resistor and a second capacitor connected in series.

13. The standby power reduction device of claim 12, wherein if the second output voltage is generated, the time constant circuit reduces capacitance of the first capacitor by turning on the second switching transistor.

14. The standby power reduction device of claim 12, wherein the time constant of the time constant circuit is set to be greater than a sum of a time required to turn on the control transistor and a time required to turn on the first switching transistor.

15. The standby power reduction device of claim 5, further comprising a time constant circuit electrically connected between an output terminal of the SMPS and the main switch, wherein the time constant circuit has a resistor and a second capacitor connected in series.

16. The standby power reduction device of claim 15, wherein if the second output voltage is generated, the time constant circuit reduces capacitance of the first capacitor by turning on the second switching transistor.

17. The standby power reduction device of claim 15, wherein the time constant of the time constant circuit is set to be greater than a sum of a time required to turn on the control transistor and a time required to turn on the first switching transistor.

18. A standby power reduction device comprising:
   a switching mode power supply (SMPS) receiving a power voltage rectified from AC power and generating a first output voltage and a second output voltage;
   a voltage-dividing circuit electrically connected to the SMPS, receiving the second output voltage and generating a divided voltage;
   a control circuit electrically connected to the voltage-dividing circuit, operated by the divided voltage and including a control transistor;
   a charging circuit electrically connected to the control circuit, operated by the control circuit and including a booster transistor;
   an electric double layer capacitor (EDLC) electrically connected to the charging circuit and charging electric energy by the charging circuit;
   a voltage detector connected in parallel to the EDLC and detecting a charge voltage of the EDLC;

a control switch electrically connected to the control circuit, operated by the control circuit and including a first switching transistor;

a main switch operated by the control switch, controlling the operation of the SMPS and including a second switching transistor and a wired OR circuit;

a photo-coupler controlling the operation of the main switch according to a command of a device operated by a first output voltage; and a time constant circuit electrically connected between an input terminal of the SMPS and the main switch, wherein the time constant circuit operates the SMPS using a current flowing in the time constant circuit when an electronic device is connected to the AC power for the first time.

19. The standby power reduction device of claim 18, wherein the time constant of the time constant circuit is set to be greater than a sum of a time required to turn on the control transistor and a time required to turn on the first switching transistor.

20. The standby power reduction device of claim 18, wherein the second switching transistor is operated by logically summing (ORing) on an output of the photo-coupler, an output of the voltage detector, an output of the control circuit and an output of the time constant circuit.

* * * * *